(12) United States Patent
Dogan et al.

(10) Patent No.: US 6,447,712 B1
(45) Date of Patent: Sep. 10, 2002

(54) METHOD FOR SINTERING CERAMIC TAPES

(75) Inventors: Fatih Dogan; Jian-Huei Feng; Lucian G. Ferguson, all of Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/473,475

(22) Filed: Dec. 28, 1999

Related U.S. Application Data (60) Provisional application No. 60/113,993, filed on Dec. 28, 1998.

(51) Int. Cl.[7] ............................................. C04B 33/32
(52) U.S. Cl. ...................... 264/608; 264/607; 264/671; 264/672; 264/673; 428/325
(58) Field of Search ................................ 264/607, 608, 264/671, 672, 673

(56) References Cited

U.S. PATENT DOCUMENTS

| | | | | |
|---|---|---|---|---|
| 4,756,959 A | * | 7/1988 | Ito et al. ...................... | 428/423 |
| 5,085,720 A | * | 2/1992 | Mikeska et al. ............... | 156/89 |
| 5,359,760 A | | 11/1994 | Busse et al. ................. | 29/25.35 |
| 5,370,759 A | * | 12/1994 | Hakotani et al. ............. | 156/89 |
| 5,387,474 A | * | 2/1995 | Mikeska et al. ............... | 156/89 |
| 5,527,501 A | | 6/1996 | Sawada et al. ................ | 264/57 |
| 5,620,637 A | | 4/1997 | Kaga et al. .................... | 264/57 |
| 6,015,517 A | * | 1/2000 | Casey .......................... | 264/44 |
| 6,139,666 A | * | 10/2000 | Fasano et al. ............ | 156/89.18 |

FOREIGN PATENT DOCUMENTS

| JP | 56096783 A | 8/1981 |
|---|---|---|

OTHER PUBLICATIONS

Asakura, M. et al. (1982), "Sintering Properties of a PLZT Thick Film," Annual Report of the Engineering Research Institute Faculty of Engineering, University of Tokyo 41: 185–190.

Bordia, R.K. and Raj, R. (1985), "Sintering Behavior of Ceramic Films Constrained by a Rigid Substrate," *J. Am. Ceram. Soc.* 68(6):287–292.

Cannon et al. (1986), "Disperants for Nonaqeous Tape," In *Multilayer Ceramic Devices*, p. 161–174.

Cheng, S.Y. et al. (1986), "The Properties of Low–Temperature Fired Piezoelectric Ceramics," *J. Mater. Sci.* 21:571–576.

Chiang, S. et al. (1981), "Effect of Processing on Microstructure and Properties of PZT Ceramics," *Am. Ceram. Soc. Bull.* 60(4):484–489.

(List continued on next page.)

Primary Examiner—James Derrington
(74) Attorney, Agent, or Firm—Greenlee, Winner and Sullivan, P.C.

(57) ABSTRACT

Flexible setter powder deposition sheets containing setter powders were developed for sintering of ceramic articles including tapes by an economical, fast and simple method. The sheets provide for deposition of a thin and uniform layer of setter powders on a green ceramic article after burnout of a binder in the sheet. Because of high strength and low burnout temperature, hydroxypropyl methylcellulose binder is preferred for production of these sheets. Tape cast sheets with low solids loading can be obtained by optimizing the wetting behavior of aqueous slurries on tape carrier. Setter, powder deposition sheets are of particular benefit in processing of thin ceramic tapes, particularly for processing of piezoelectric ceramic tapes. Tapes can be processed in a sandwich formed by layering setter powder deposition sheets between tapes and cover plates employed to maintain tape flatness and to reduce evaporation of volatile components of the ceramic.

19 Claims, 7 Drawing Sheets

OTHER PUBLICATIONS

Evans, J. and De Jonghe, L. (1991) in *The Production of Inorganic Materials*, Macmillan Publishing Company, New York, pp. 417–420.

Fries, R. and Moulson, A.J. (1994), "Fabrication and Properties of an Anisotropic PZT/Polymer 0–3 Composite," *J. Mater. Sci.: Material in Electronics* 5:238–243.

German (1985) in Liquid Phase Sintering, Plenum Press, New York, pp. 4–5.

Good, R.J. and Koo, M.N. (1979), "The Effect of Drop Size on Contact Angle," *Journal of Colloid and Interface Science* 71(2):283–292.

Hellenbrand (1996), "Type Casting," *Mater. Sci. Technol. : a Comprehensive Treatment* 17a:189–265.

Hind and Knott (1997) in *Electroceramics: Production Properties and Microstrucrures*, Lee and Bell (eds.), pp 107–119.

Hortz, D. and Geil, P. (1995), "Review: Aqueous Tape Casting of Ceramic Powders," *Mater. Sci. Eng.* A202:206–217.

James, A.D. and Messer, P.F. (1978), "The Preparation of Transparent PLZT Ceramics from Oxide Powders by Liquid Phase Sintering," *Trans. J. Br. Ceram. Soc.* 77(5):152–158.

Kingery et al. (1976) in *Introduction to Ceramics*, $2^{nd}$ ed., Wiley and Sons, New York, p. 183.

Kingon, A.I. and Clark, J.B. (1983), "Sintering of Ceramics: I, Atmosphere Control" *J. Am. Ceram. Soc.* 66(4):253–256.

Kingon, A.I. and Clark, J.B. (1983), "Sintering of Ceramics: II, Effect of PbO Content on Densification Kinetics," *J. Am. Ceram. Soc.* 66(4):256–260.

Mistler, R.E. et al. (1978) "Type Casting of Ceramics," *Ceramic Processing Before Firing*, Wiley–Interscience, New York, pp. 411–448.

Scherer, G.W. and Garino, T. (1985), "Viscous Sintering on a Rigid Substrate," *J. Am. Ceram. Soc.* 68(4):216–220.

Shanefield, D.J. (1996) in *Organic Additives and Ceramic Processing*, Kluwer Academic Publishers, pp 171–254.

Snow, G.S. (1973), "Fabrication of Transparent electrooptic PLZT Ceramics by Atmosphere Sintering," *J. Am. Ceram. Soc.* 56(2):91.96.

Snow, G.S. (1973), "Improvements in Atmosphere Sintering of Transparent PLZT Ceramics," *J. Am. Ceram. Soc.* 56(9):479–480.

Stevenson, J.W. (1994), "Fabrication and Characterization of PZT/Thermoplastic Polymer Composites for High–Frequency Phased Linear Arrays," *J. Am. Ceram. Soc.* 77(9):2481–2484.

Webster, A.H. et al. (1967), "Effect of PbO on the Piezoelectric Properties of Lead Zirconate–Titanate Ceramic," *J. Am. Ceram. Soc.* 50(9):490–491.

Williams, J.C. (1976), "Doctor–Blade Process," in *Treatise on Material Science and Technology*, vol. 9: Ceramic Fabrication Process, pp. 173–198.

Wittmer, D.E. and Buchanan, R.C. (1981), "Low–Temperature Densification of Lead Zirconate–Titanate with Vanadium Pentoxide Additive," *J. Am. Ceram. Soc.* 64(8): 485–490.

Zhilun, Gui et al. (1989), "Low–Temperature Sintering of Lead–Based Piezoelectric Ceramics," *J. Am. Ceram. Soc.* 72():486–491.

* cited by examiner

METHOD FOR SINTERING CERAMIC TAPES

This application takes priority under 35 U.S.C. § 119(e) from U.S. provisional application Serial No. 60/113,993, filed Dec. 28, 1998, which is incorporated by reference herein in its entirety to the extent that it is not inconsistent with the disclosure herein.

BACKGROUND OF THE INVENTION

Cracking, warping, and surface deterioration often occur during firing of ceramic tapes. In addition, for tapes containing volatile components out-diffusion of materials can be a significant problem. A variety of approaches have been applied in attempts to solve these problems. However, no solution has been completely satisfactory. In a conventional approach a flat refractory cover plate (or setter) is placed on top of the unfired ("green") ceramic tapes in order to prevent severe warping or wrinkling of the tapes during burn-out of organic binders in the tapes and sintering of the tapes at high temperatures (M. Asakura et al. (1982) Annual Report of the Engineering Research Institute Faculty of Engineering, University of Tokyo, Vol. 41, pp. 1 85–190). The cover plates used must be heavy enough to press the green ceramic tape flat during the sintering process, but the weight of the cover plate generates shear forces on the faces of the relatively fragile tape as it contracts (Kaga et al. U.S. Pat. No. 5,620,637 and Sawada et al. U.S. Pat. No. 5,527,501). The forces imposed on the tapes by the use of the cover plate makes them very susceptible to fracturing and destruction, particularly if the composition contains a volatile or liquid phase, such as PbO. In addition, the cover plates, if not completely chemically inert and compatible with the tapes at high temperatures, can bond or stick to the ceramic tapes during firing.

Many commercially important ceramic tapes have a volatile phase, such as PbO in piezoceramic-based tapes, e.g., PZT or PLZT ceramic tapes. At high temperatures, PbO will readily diffuse into the cover plate from these tape, resulting in a lead-deficient PZT or PLZT tape with very poor functional properties after firing. Loss of PbO from these materials adversely affects electromechanical coupling factors and dielectric constants (Webster A. H. et al. (1967) J. Am. Ceram. Soc. 50(9):490).

One way to prevent or decrease cracking and sticking is by coating the green ceramic tape with a suitable dry refractory ceramic powder (setter powder) by sprinkling, sifting, rubbing and/or brushing the ceramic powder onto and between green tapes or other shaped green ceramic articles (e.g., Fries, R. and Moulson, A. J. (1994) J. Mater. Sci.: Mater. in Electronics 5:238). One major problem with this method is non-uniformities in powder dispersion which lead to surface deformations and defects in the thin ceramic plates that cannot be tolerated in many applications. It is not practical to disperse powders uniformly over the delicate, thin, unfired tape and keep the powders uniformly dispersed as the tape is covered with the cover plate, transported and then fired. The use of loose powders in tape processing is additionally disadvantageous because it is inherently a slow and tedious process and can be wasteful with respect to the powders employed. Further, the use of loose powders, which can become airborne, in a manufacturing process can represent a respiratory hazard.

A second approach to improving firing of ceramic tapes or other shaped articles is the use of a solvent to disperse a thin layer of setter powder on tapes by dipping or wet spraying the tapes prior to firing. This method may be used to achieve acceptable uniformity. The solvent used must, however, be carefully selected. The solvent can exhibit poor wetting characteristics that result in particle agglomeration or it can dissolve binders and additives in the green tape destroying the integrity of the tape.

Other methods for protecting tapes rely on application of a thin ceramic coating to the cover plate, usually in the form of a relatively inert layer of zirconia or other refractory ceramic or as a thin platinum coating or foil (Hind, D. and Knott, P. R. (1997) in *Electroceramics: Production, Properties and Microstructures,* W. E. Lee and A. Bell (Eds.), The Institute of Materials, London, UK, p. 107; and Stevenson, J. W. et al. (1994) J. Am. Ceram. Soc. 77(9):2481). Platinum foils, refractory ceramic plates or setter powder can also be placed between stacked ceramic tapes during firing. These methods tend to have high materials and manufacturing costs. Some manufacturers supply cover plates with textured surfaces to provide only "point contacts" with the green tapes. These methods attempt to eliminate the need for uniformly disperse powder, prevent out-diffusion and unwanted bonding of tapes to the cover plate. A major limitation of these methods, however, is that they are not effective for use with large area ceramic tapes with thicknesses of a hundred microns or less that are required in many important current applications. The inherent shear forces and increased friction produced by cover plates having permanent barrier coatings or textured surfaces are still too high for more delicate thin ceramic tapes and their use results in cracked and broken tapes.

In a related method, Busse et al. in U. S. Pat. No. 5,359,760 report the use of solid ceramic separator plates (setters) with high PbO content to prevent out-diffusion of volatile PbO from PLZT and PZT ceramic tapes. These plates or setters lose lead and must be replaced relatively frequently and cannot maintain their flatness. Further, these solid separator cover plates are not expected to be useful for large area very thin tapes because the friction and shear forces remain too high.

As noted above, loss of PbO from PLZT and PZT tapes is a significant problem during sintering. A common way of reducing PbO loss is to place the PLZT or PZT green tapes in a closed crucible surrounded with lead-containing atmosphere powders (Snow, G. S., (1973) J. Am. Ceram. Soc. 56(2):91; Snow, G. S., (1973) J. Am. Ceram. Soc. 56(9):479; Kingon, A. I. and Clark, J. B. (1983) J. Am. Cerm. Soc. 66(4):253). Other approaches have focused on decreasing sintering temperature by adding liquid phase agents (Wittmer, D. E. and Buchanan, R. C. (1981) J. Am. Cerm. Soc. 64(8):485; Cheng et al. (1986) J. Mater. Sci. 21:571; Zhilun et al. (1989) J. Am. Cerm. Soc. 72(3):486). The presence of a liquid phase promotes densification kinetics during sintering (James, A. D. and Messer, P. F. (1978) Trans. J. Br. Ceram. Soc. 77(5):152; and German, R. M. (1985) *Liquid Phase Sintering,* Plenum Press, New York, N.Y.). Excess PbO can act as a liquid phase agent and has been reported to affect grain size and density of piezoceramics (James, A. D. and Messer, P. F. (1978) Trans. J. Br. Ceram. Soc. 77(5):152; Chian, S.-S. et al. (1981) Am. Ceram. Soc. Bull. 60(4):484). It has also been reported that high amounts of excess PbO can only increase densification rates in the early stage, and will lower the final density of ceramic bodies due to evaporation of PbO at elevated temperatures (Kingon, A. I. and Clark, J. B. (1983) J. Am. Ceram. Soc. 66(4):256).

PLZT and PZT tapes are often co-fired in multiple layer stacks. In this case, the tapes may stick together and be difficult to separate without fracturing. This problem can be solved by placing platinum foils, solid PZT plates, or setter powder between tapes and between the tapes and the cover plates. The use of platinum foil and PZT plates is not economical for mass production of tapes and the disadvantages of the use of loose setter powder has been discussed above.

The present invention provides an improved method and low cost buffer sheets useful in the method for firing ceramic tapes or other shaped articles, particularly thin tapes and articles with thin walls, and particularly those combining large surface area with thin and more particularly for PLZT and PZT tapes.

SUMMARY OF THE INVENTION

The present invention provides an inexpensive, non-toxic, simple and reliable method for obtaining uniform and thin layers of particles or powders that are particularly useful an anti-sticking and anti-friction coatings during the fusion and densification (or sintering) of ceramic tapes and other shaped articles. The method is particularly useful for sintering of large area, very thin ceramic tapes. In application to very thin tapes and large surface area thin materials, the present invention provides a satisfactory firing method where other approaches have failed. The method facilitates application of a thin and uniform layer of non-sinterable (i.e., refractory) particles on the green tapes or articles to provide a reduction in shear stress from cover plates (i.e., refractory) particles on the green ceramic articles to provide a reduction in shear stress from cover plates. The method provides sufficient protection to allow the production of relatively large area thin ceramic plates not previously attainable by any comparable method. The method is also particularly useful for ceramic articles that contain volatile components or that require sintering in the presence of a liquid phase. In a specific embodiment, the method of the present invention is useful for the sintering of piezoceramic tapes and multi-layer stacks of these ceramic tapes. The methods of this invention are particularly useful in the manufacture of crack-free ceramic tapes with thicknesses in the range of 100's of microns or less with minimal surface defects.

In a preferred embodiment, the method employs setter powder deposition sheets which are thin sheets having a binder layer which contains refractory powders or particles (e.g., setter powder). The setter powder deposition sheets are placed between unfired (or green) ceramic shaped articles, including green tapes and green plates, and top and bottom refractory ceramic cover plates or placed between stacked layers of green ceramic articles, particularly between green tapes. Use of the sheets during firing deposits a uniform layer of refractory particles or powder on the surface of the green article minimizing or preventing fracturing. The sheets are particularly useful in sintering of ceramic tapes when ceramic cover plates are used during burning-out and sintering to keep tapes flat. The sheets also minimize or prevent sticking of the ceramic articles to be fired to each other or to the cover plates and minimizes surface defects therein. Further, the buffer sheets when used with cover plates minimize or prevent loss of volatile components, from ceramic articles that are fired such as PbO from piezoelectric ceramic (e.g., PZT or PLZT ceramics), during burn-out and sintering.

Setter powder deposition sheets can be economically fabricated in large quantities using conventional methods, e.g., tape casting, processed using conventional paper handling techniques and conveniently stored in pre-cut sheets. These sheets are sintering aides that provide a thin uniform layer of setter powder on green ceramic tapes during firing. During burn-out of the thermally fugitive components of the buffer sheets, free ceramic particles or powders are left on the surface of the ceramic shaped article in a very uniform thin layer. These refractory powders or particles are selected so that they have a tendency to resist bonding or fusion and thereby provide a slippery medium between the ceramic article and the cover plates (or other ceramic tapes or articles) during firing. The refractory particles or powders originating from the setter powder deposition sheets and remaining after firing can be easily washed or blown off the sintered tapes or other articles. The sheets are easy to store and dispense and can greatly reduce problems with clean-up and respiratory hazards for airborne particles.

The method of this invention also avoids pile-up of particles of setter powder during shrinkage of the green tape on firing. Particle pile-up can results in warping and surface defects in the sintered tapes or other shaped articles. The binder used in the setter powder deposition sheets is selected to have a lower burn-out temperature than any binder employed in the green ceramic tapes or other shaped articles. The binder used in the setter powder deposition sheets preferably has a burn-out temperature that is significantly lower than that of any binder used in the green ceramics. The binder used in the setter deposition sheets is preferably selected so that the green strength of the green ceramic article to be sintered remains high during binder burn-out of the buffer sheets. It is believed that the setter powders tend to form a weak bond with the green ceramic tape and that the separation between individual setter particles is reduced as the green tape contracts.

In a specific embodiment, setter powder deposition sheets are cast by conventional tape casting methods on a suitably carrier, e.g., Mylar (Trademark, DuPont) foil. The slurry used for tape casting comprises setter powder and a binder in an aqueous or non-aqueous carrier. Preferred slurries also contain plasticizers and/or wetting agents. Slurries may also contain inert fillers. Preferred carriers are inert with respect to the various slurry components and are appropriate for use with conventional methods for preparing ceramic tapes or sheets, including tape casting techniques. A more preferred support material for forming sheets is Mylar foil. In preferred embodiments, support material is provided with a thin coating of a wetting agent to facilitate deposition of the slurry.

The method of the present invention is not specifically intended to prevent shrinkage of green ceramic tape or other shaped articles.

This invention includes setter powder deposition sheets, methods of making these sheets and methods of using these sheets in ceramics processing.

BRIEF DESCRIPTION OF THE FIGURES

In FIG. 3A there is no wetting agent and no wetting agent coated on the carrier. In FIG. 3B there is 0.83 wt % wetting agent in the binder and no wetting agent coated on the carrier. In FIG. 3C there is no wetting agent in the binder, but wetting agent coated on the carrier surface. In FIG. 3D there is 0.83 Wt % wetting agent inthe binder and wetting agent coated on the carrier surface. The carrier was silicone-coated Mylar, the binder was hydroxypropyl methylcellulose and the wetting agent was ethoxylated 2,4,7,9-tetramethyl 5 Decyn-4,7-Diol, provided as Surfynol SE-F.

DETAILED DESCRIPTION OF THE INVENTION

The term "setter powder deposition sheet" is used herein to refer to a coated substrate sheet used to improve sintering in the manufacture of ceramic tapes and other shaped ceramic articles. The sheet comprises a substrate or carrier material having a coating layer comprising refractory powder or particles in a fugitive binder on at least one surface of the substrate. Buffer sheets are placed in contact with green ceramic shaped articles, including green ceramic tapes, prior to firing to minimize cracking and surface defects in the ceramic. The binder is fugitive in that it is burned-out during firing of the ceramic article leaving behind a uniform layer of refractory powder of particles on the ceramic article which functions to protect the ceramic during firing. Setter powder deposition sheets are prepared by coating a slurry containing an appropriate binder impregnated with refractory powder or particles on to an appropriate carrier material. The sheets may be prepared by any method known in the art for coating carriers, but tape casting methods are preferred. The slurry can be formed into a thin layer on the substrate, for example, by doctor-blading, rolling, mashing, extrusion or other methods known in the art. Doctor-blading is a preferred method for forming setter powder deposition sheets of this invention. Carriers may carry additional surface coatings. For example, any surface not provided with the binder coating layer may carry a silicone layer. In a preferred embodiment, carrier surfaces that are intended to receive the binder layer are treated with a wetting agent prior to coating with the binder layer to facilitate uniform coating of the slurry on the substrate.

Any carrier can be employed that is compatible with ceramic processing, with the ceramic material being processed and with the selected binder. The carrier may be a film material, such as a polyester carrier film, e.g., Mylar (Trademark, DuPont), any polymeric carrier foil, such as Teflon (Trademark, DuPont), or a solid material such as a glass sheet or plate. Mylar is a preferred material for preparation of setter powder deposition sheets by tape casting methods.

The refractory powder or particles are ceramic material, such as metal oxides and mixtures thereof that are compatible with the binder employed and which do not substantially react with, bind to or otherwise deleteriously affect the properties of the ceramic material that is to be fired. Useful refractory materials include zirconia, alumina, magnesia, like refractory materials and mixtures thereof. Zirconia is a preferred refractory material for preparation of setter powder deposition sheets.

Slurries used for preparing setter powder deposition sheets contain a binder, refractory material and an appropriate solvent (or solvent mixture) for the binder to adjust the viscosity of the slurry. Slurries may be aqueous (where the solvent is water or another aqueous medium) in which case a water-soluble binder is employed. Non-aqueous slurries may also be used and in this case the binder is selected to be soluble in the solvent system to be used. The solvent used in the slurry must also be compatible with the carrier that is to be employed for the sheets. Slurries preferably contain a wetting agent to facilitate uniform coating of the substrate. Any wetting agent that is compatible with the other components of the slurry and the substrate may be used. It has been found that providing a layer of wetting agent on a carrier surface prior to applying the slurry to that surface improves the uniformity of the binder layer on the carrier.

An ethoxylated alkyne diol, ethoxylated 2,4,7,9-tetramethyl-5-decyn-4,7-diol, employed as Surfynol SE-F (Trademark, Air Products) was found to be a suitable wetting agent for preparation of setter powder deposition sheets. A variety of known wetting agents can be employed for preparation of these sheets. Wetting agents must be generally compatible with the components of the slurry and with the carrier employed in the setter powder deposition sheets. Those of ordinary skill in the art can readily choose an appropriate wetting agent for use with a particular carrier and slurry using what is known in the art and methods illustrated herein for assessment of wetting properties of slurries. For example, alkoxylated alkyne diol wetting agents are generally useful. Wetting agents of the Surfynol-type, particularly those that are derivatized alkyne diols, can also be used.

One or more plasticizers, dispersants, and/or fillers may also be added to the slurry and retained in the binder layer on the substrate.

Slurries are preferably composed of from about 5–to about 10 wt. % of setter powder with average particle size preferably of about 12–about 18 $\mu$m, about 1 wt. %–about 4 wt. % of binder about 0.3 wt %–about 1.2 wt. % plasticizer (if present) about 0.1 wt. %–about 0.9 wt. % wetting agent (if present) with the remainer solvent. The amount of solvent (water or a non-aqueous solvent, e.g., xylene/ethanol mixtures) is preferably adjusted to obtain viscosity appropriate for the method employed for coating the binder layer on the carrier.

The invention is further described by reference to the Figures where in FIGS. 1A–C and 2 like numbers represent like features.

Figure 1A:
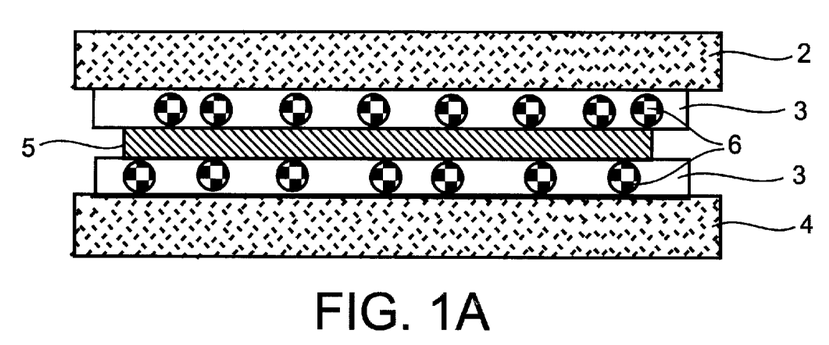
FIGS. 1A–C illustrate the process of this invention for firing ceramic tapes using buffer sheets.
Figure 1B:
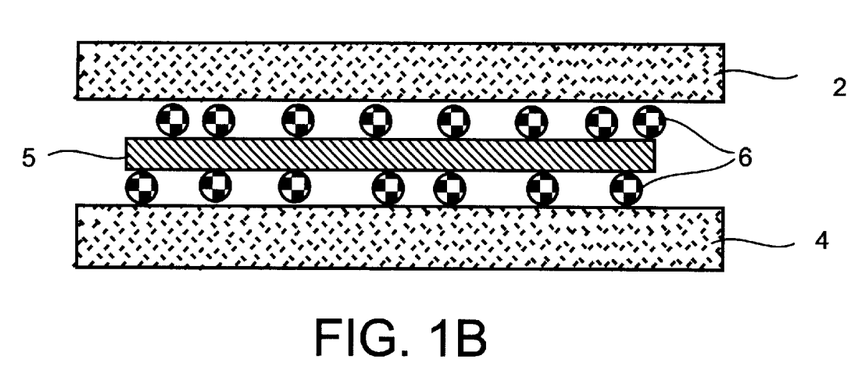
Figure 1C:
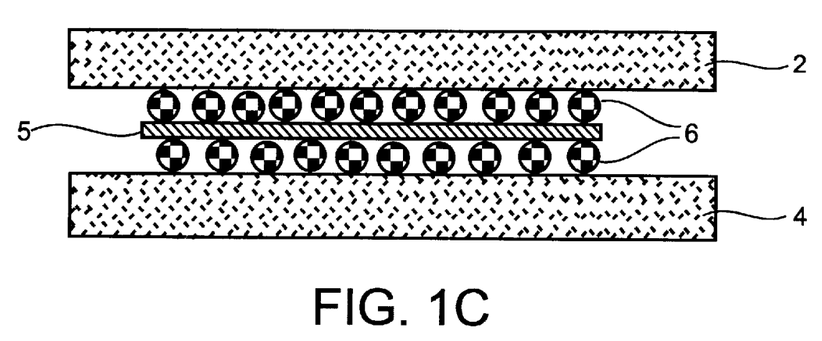

FIGS. 1A–C illustrate the process of firing of PLZT ceramic tapes using the buffer sheets of this invention. FIG. 1A illustrates the positioning of buffer tapes 3 on either side of a green PLZT tape 5 between the tape and the upper and bottom cover plates (or setters) 2 and 4, respectively, before firing. The buffer tape is illustrated schematically as containing setter powder 6 in dried slurry (carrier not shown). It is generally desirable for the binder used in the setter powder deposition sheet to have a lower burn-out temperature than the binder used in the ceramic article to be sintered. The burn-out temperature of the binder in the setter powder deposition sheet is preferably sufficiently lower than that any binder used in the green ceramic article such that the binder in the setter powder deposition sheet is substantially burned out before the binder in the green tape, resulting in the intermediate structure illustrated in FIG. 1B. After the setter powder deposition sheet binder is burned-out, any binder in the ceramic tape is burned out and the ceramic is sintered as illustrated in FIG. 1C which shows setter particles 6 between the sintered ceramic tape 10 and the setter plates 2 and 4. Binders in the setter powder deposition sheets are further preferably selected to minimize shrinkage or contraction of the sheets before and during binder burn-out. Binders that directly sublimate are advantageous for this reason.

Figure 2:
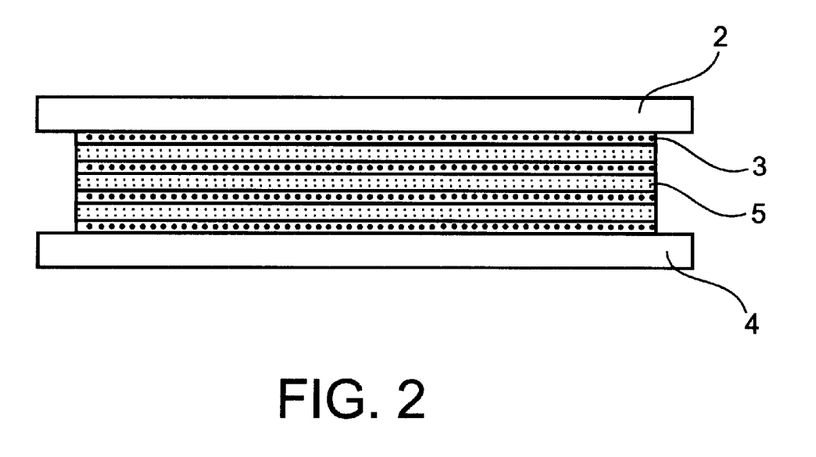
FIG. 2 illustrates a sandwich structure for firing stacks of PZT or PLZT tapes.

FIG. 2 illustrates another embodiment of the method illustrated in FIGS. 1A–C. In this case, a plurality of green tapes 5 are stacked with a setter powder deposition sheet 3 between each tape and between the uppermost tape and the upper cover plate 2 and between the bottommost tape and the bottom cover plate 4. The arrangement of the tapes and setter powder deposition sheets in a sandwich structure is believed to act as a closed or nearly "sealed" crucible that restricts the evaporation of PbO to the edge of the tapes. In this structure, the gaps between the tapes and the plates are narrow and saturated with PbO vapor during sintering. Since PbO vapor can escape only along the edges of the tapes, high PbO partial pressure that is maintained between the PLZT tapes in this stacked structure is believed to reduce PbO evaporation significantly. The embodiments illustrated in FIGS. 1A–1C and 2 are also used in preparation of PZT ceramic tapes.

The setter powder deposition sheets used in the present invention are very effective in conjunction with dense, non-porous, ceramic cover plates to sinter green ceramic tapes and other articles in which the green article contains a volatile component, such as PbO. Their use prevents sticking, breakage, surface defects and other non-uniformity in the fired ceramic. As indicated above, it is believed that the use of the setter powder deposition sheets creates a substantially sealed environment when used with cover plates so that losses of the volatile component is significantly reduced. Containment of volatile components during sintering also prolongs the lifetime of the cover plates.

Setter powder deposition sheets of this invention are also preferably resistant to plastic deformation, despite being very thin. This facilitates easier application to flat surfaces minimizing wrinkles or folds. Setter powder deposition sheets should also have a high strength to weight ratio. Binders and other slurry components can be readily selected in view of the description herein to achieve these desirable properties. Hydroxy methyl cellulose binders, in particular, have given satisfactory results.

Setter powder deposition sheets of this invention are thin sheets having a carrier coated with a predetermined amount of thermally fugitive binder impregnated with a refractory ceramic that can function as a setter powder. The binder may be composed of one or more binder components. The carrier binder layer may also contain one or more plasticizers, one or more wetting agents, one or more dispersing agents or fillers. The setter powder deposition sheet is typically prepared from a slurry containing binder, any plasticizer, any wetting agent, any dispersing agent and any filler in combination with the refractory particles. The setter powder deposition sheet is typically prepared by tape casting the buffer slurry onto the carrier.

Setter powder deposition sheets can be fabricated using a significant amount of secondary thermally fugitive filler material or non-soluble additives to modify or control the viscosity, to regulate the distribution of ceramic powders or particles or to facilitate the deposition of ceramic particles or powders during the binder burn-out stage of the sintering process of this invention.

Binders used in the setter powder deposition sheets can be water-soluble or non-water-soluble. Useful water-soluble binders include, among others, polyvinyl alcohol (PVA), polyvinylacetate (PVAc), polyethylacrylate (PEA), polymethyacrylate (PMAA), poly acrylic acid (PAA), polymethylmethacrylate (PMMA), polyvinylpyrrolidine (PVP), copolymers of acrylic acid and acrylic ester, and a low molecular weight wax, such as Ecosane (Trademark), alone or in combination.

Non-aqueous setter powder deposition sheet slurries can contain solvents including among others, aromatics (e.g., xylenes and toluene), alcohols (e.g., ethanol, methanol, butanol, isopropanol), ketones (e,g, acetone and methyl ethyl ketone) esters (e.g., ethyl acetate) and halogenated solvent (e.g., trichloroethylene) alone or in combination. Binders useful in non-aqueous slurries include, among others, polyvinyl butyral, polyvinyl acrylate, polyethylene glycol, waxes or combinations thereof.

Water with high surface tension usually leads to poor wetting of aqueous slurries on polymeric carriers used in tape casting. Therefore, it is common to use a wetting agent to lower the surface tension of water. However, at very low solids loading of a slurry, wetting may not be satisfactory even if a wetting agent is added.

According to Young's equation, the contact angle θ is affected by surface tension γ between solid (s), liquid (l) and gas (v) phases as:

$$\cos\theta = \frac{\gamma_{sv} - \gamma_{sl}}{\gamma_{lv}}$$

Adding wetting agent into the slurry was found to decrease θ, likely by lowering $\gamma_{lv}$. Another possible way to improve wetting is to change the surface characteristic of the substrate. It was found that applying a thin coating of wetting agent on the carrier (Mylar foil) also decreased contact angle. It is believed that applying this surface coating of wetting agent lowered $\gamma_{sl}$ or increased the value of $(\gamma_{sv} - \gamma_{sl})$, which, in turn, would decrease the contact angle θ.

Figure 3A:
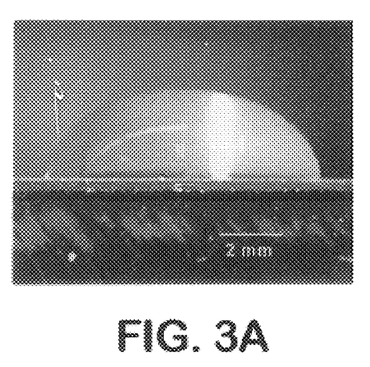
FIGS. 3A–D are photographs of sessile drops of binder solutions on carrier showing the effect of the use of wetting agent in the binder and/or on the carrier surface.
Figure 3B:
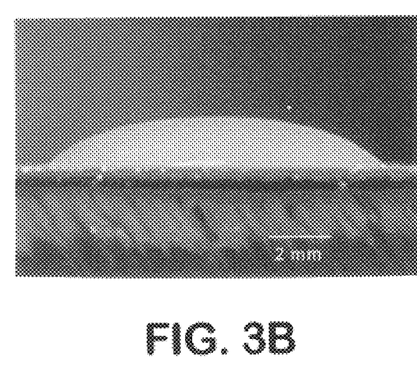
Figure 3C:
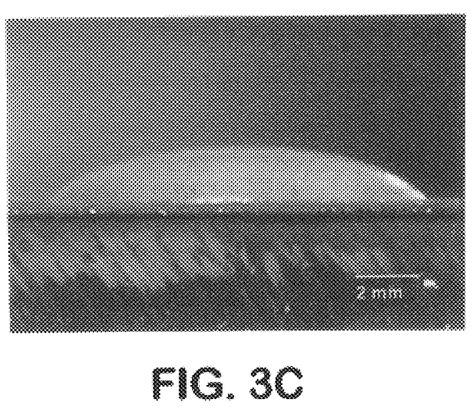
Figure 3D:
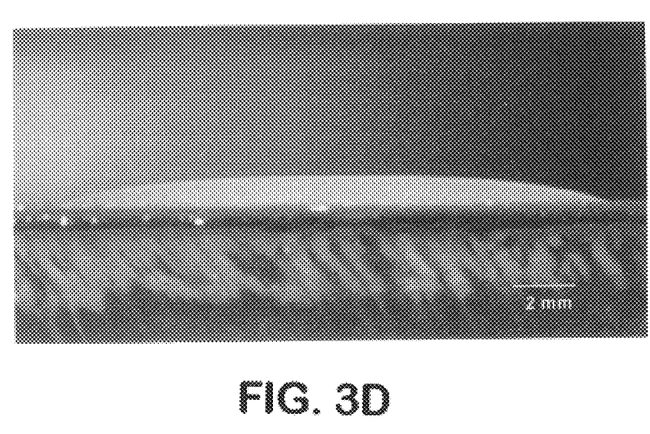

FIGS. 3A–D show photographs of sessile drops of binder solution on carrier under different conditions. FIG. 3A shows a drop of binder solution with no wetting agent on a Mylar carrier. FIG. 3B shows that addition of wetting agent (0.83 wt % Surfynol SE-F in binder solution) improves wetting of binder solution on the carrier. FIG. 3C shows that the wetting of binder solutions without any other additives can also be improved by applying a thin layer of wetting agent Surfynol SE-F on Mylar. Optimum spread of aqueous binder solution as shown in FIG. 3D, however, was achieved by adding the wetting agent into the binder solution as well as providing coating of a wetting solution of the same wetting agent on the Mylar foil. Setter deposition sheets with uniform thickness and smooth edge counters were obtained on Mylar carrier coated with wetting agent. It should be mentioned that commercially available silicone-coated tape carriers are not effective to improve wetting of aqueous slurries. Wetting agent was applied to the Mylar surface by rubbing the surface using a cloth dipped into neat wetting agent solution as commerically available. Wetting agent may be applied in various ways to the carrier surface, for example, it may be applied as a solution in an appropriate solvent.

Figure 4:
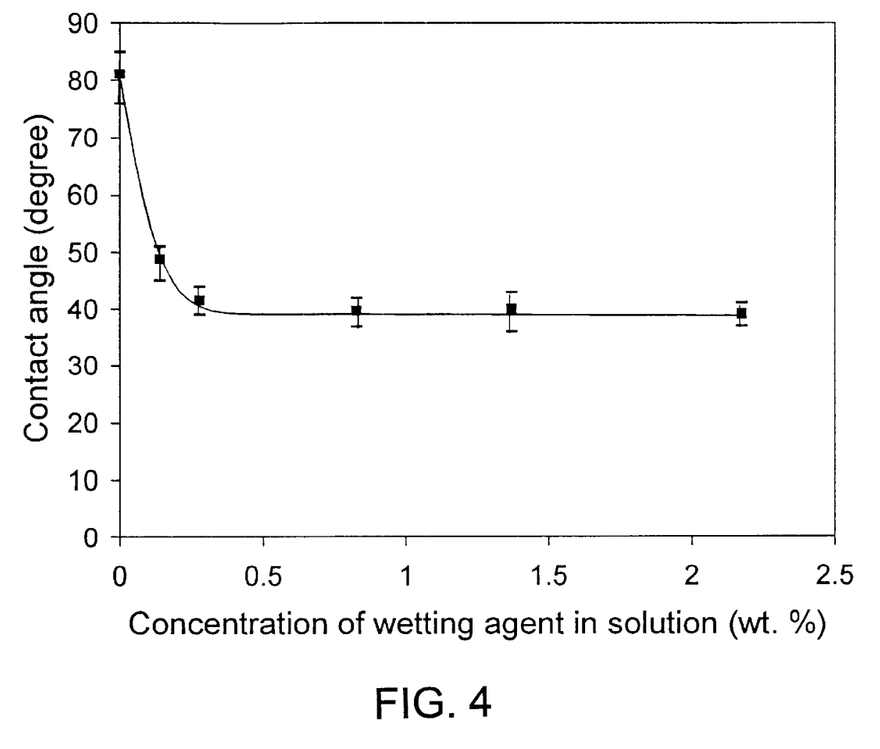
FIG. 4 is a graph of contact angle of hydroxypropyl methylcellulose solutions containing wetting agent.

FIG. 4 is a graph shows the change in contact angles of al wt. % hydroxypropyl methylcellulose binder solution on a Mylar foil as a function of the amount of wetting agent added to the binder solution. It was shown that wetting of the binder solution was significantly improved when 0.1 wt. % wetting agent was added, but higher quantities of the additive (>0.6 wt. %) did not provide additional improvement.

Figure 5:
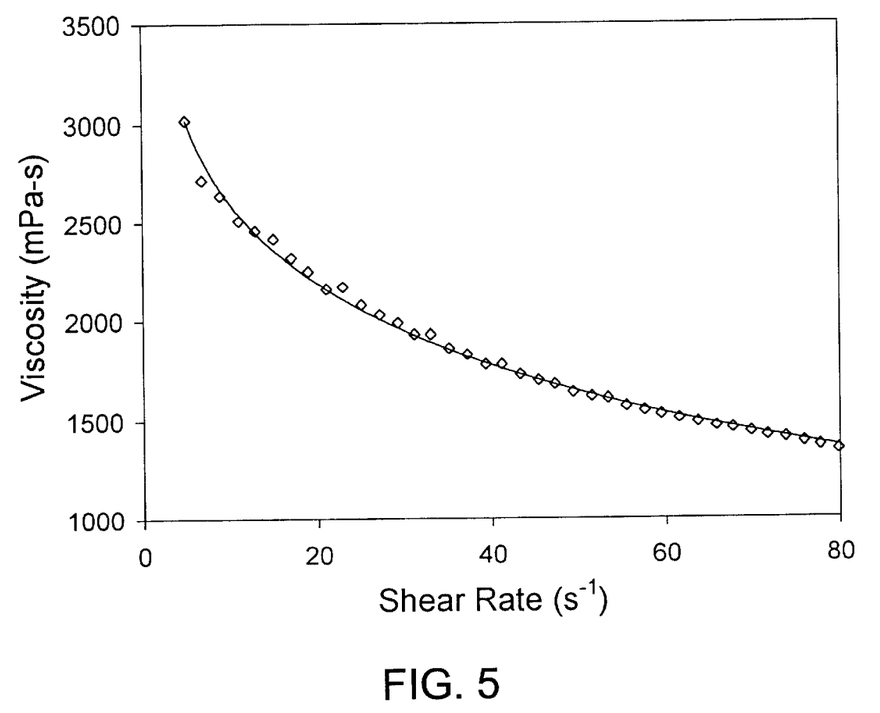
FIG. 5 is a graph of the viscosity as a function of shear rate of a typical slurry useful in preparation of the buffer sheets of this invention.

Low viscosity of the slurries may lead to sedimentation of particles before the tape casting process is completed. This can cause concentration difference of particles along the cast setter powder deposition sheets. A typical viscosity curve of a tape casting binder slurry for a successful fabrication of these sheets is shown in FIG. 5. The slurry preferably exhibits a sufficiently high viscosity to minimize particle settling. The slurry preferably has viscosity equal to or greater than about 3000 mP a-s at near zero shear rate and equal to or less than about 1000 mP a-s at shear rates up to about 80/s. Because of the shear-thinning behavior, the particles are less mobile before casting (near zero shear rate) and rearrange themselves when passing through the gap of doctor blade (high shear rate).

It is generally desirable that the binder in setter powder deposition sheets exhibits a lower burnout temperature than the binder used in the ceramic article. This allows the green article to maintain high strength when binder burn-out process takes place in the setter powder deposition sheets. If the binder of sheet burns out at the same time or later than that of ceramic article damage can occur before densification. The use of a lower temperature binder in the setter deposition sheets is particularly beneficial in processing of thin green ceramic tapes because porous and fragile green tapes can easily fracture before densification. Binders in the sheets are also chosen to minimize shrinkage or contraction of the sheets before and during binder burn-out. Binders that directly sublimate may be advantageous for this reason.

Figure 6:
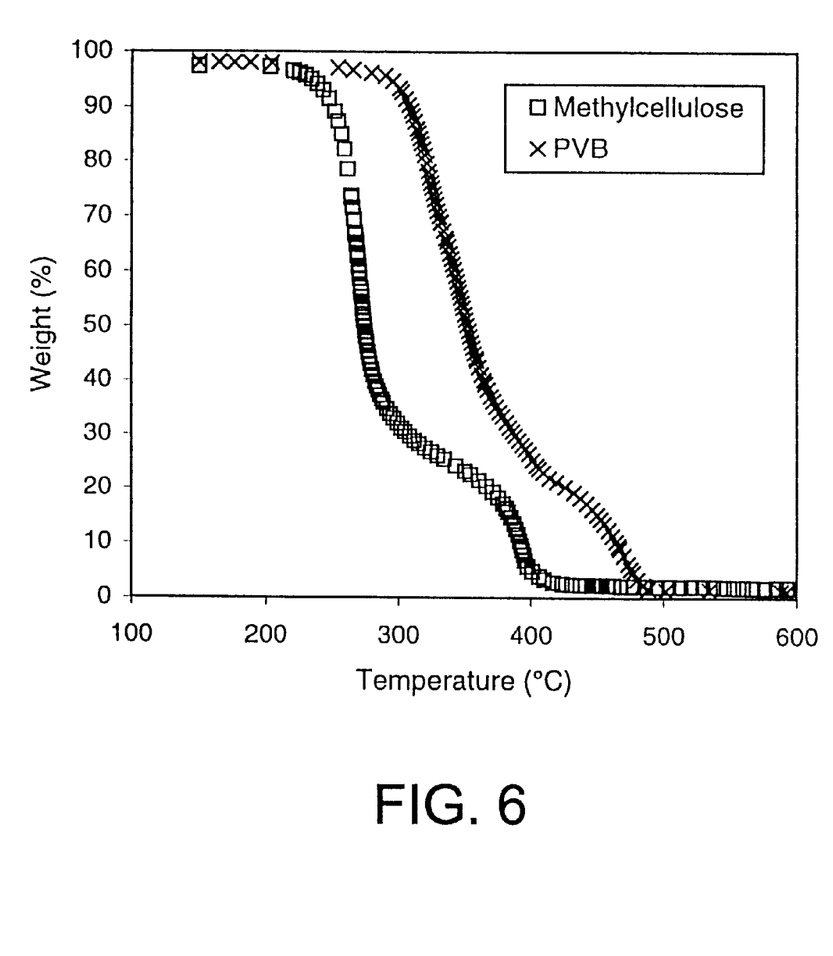
FIG. 6 is a graph of TGA curves for two different binders useful in the preparation of green ceramic tapes. The graph illustrates the onset of burn-out and the relative amounts of binder remaining as a function of increasing temperature above the onset temperature.

FIG. 6 shows the TGA (thermogravimetric analysis) curves of PVB and methylcellulose binders. The onset of binder burnout temperature for methylcellulose binder is ~250° C. (The term "burn-out temperature" as used herein refers to the temperature of the onset of burn-out). Over 70% of this binder is lost below the burn-out temperature, i.e., onset temperature of PVB binder at ~300° C. In the method of this invention, the binder of the buffer sheet is selected so that at least about 50% of the buffer sheet binder is lost below the burn-out temperature of the binder used in the green ceramic to be fired. Preferably the burn-out temperature of the ceramic binder is 35° C. or more higher than the burn-out temperature of the buffer sheet binder. More preferably the burn-out temperature of the ceramic binder is 50° C. or more higher than the burn-out temperature of the buffer sheet binder. TGA methods can, for example, be employed to assess binders appropriate for use in setter deposition sheets for a given green ceramic application.

The low burnout temperatures of methylcellulose binders makes them excellent choices for fabricating buffer sheets. Other advantages for the methylcellulose binder include: (i) easy control of viscosity of tape casting slurries with a small quantity of additive, (ii) providing high strength and low deformation for very thin buffer sheets, (iii) environmentally benign and low toxicity during binder burnout.

Figure 7:
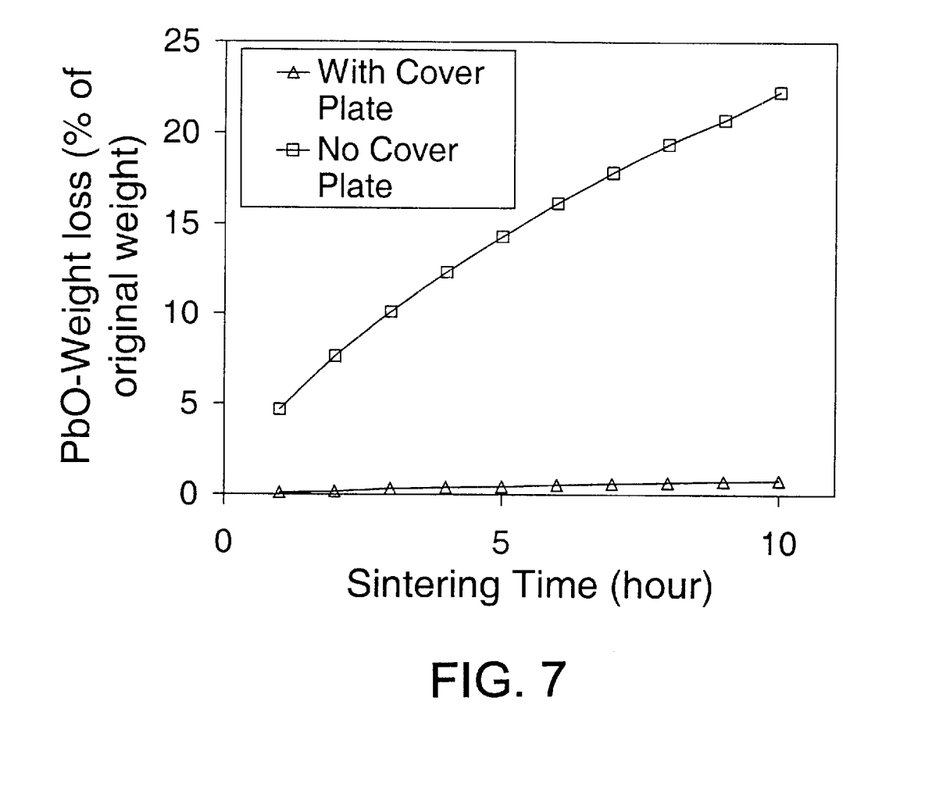
FIG. 7 is a graph of PbO-weight loss of PLZT tapes sintered with and without the use of cover plates during sintering.

The use of cover plates during sintering of piezoelectric ceramic tapes not only maintains the flatness of the tapes, but also reduces volatilization of PbO. Experiments (FIG. 7) have shown that PbO weight loss from PLZT tapes sintered at 1100° C. is significantly higher without a cover plate then when a cover plate is used. A PLZT tape fired without a cover plate lost more than 20% of its original weight after 10 hour sintering, while the weight loss was less than 1% using the cover plate. This indicates that piezoelectric ceramic tapes, e.g., PZT and PLZT tapes, with significantly improved properties can be prepared using cover plates. Use of the setter powder deposition sheets of this invention significantly improves the quality of tapes made by ceramic processing with cover sheets. The combined use of cover sheets and setter powder deposition sheets leads provides ceramic tapes with significantly improvements in quality and retention of volatile components.

PbO might diffuse or react with cover plates. Experiments using zirconia cover plates with buffer sheets of this invention and monitoring the weight of the cover plate have shown a cover plate weight gain of only ~0.01% after sintering. The setter powders deposited using the buffer sheets prevent direct contact between the piezoelectric ceramic tape and the cover plate. Another potential disadvantage of PbO diffusion into cover plates is loss of flatness after repeated firing with PbO containing ceramics. The flatness of the cover plates is important for successful sintering of such tapes. In order to prolong the life of cover plates, it would be beneficial choosing ceramic cover plates that are more stable in presence of PbO at elevated temperatures. MgO is expected to be more stable in the presence of PbO at elevated temperatures.

The weight of the cover plate was optimized to sinter flat and crack-free PLZT tapes. In this work, the thickness of cover plates was adjusted to achieve a controlled pressure between 0.00005 to 0.00015 MPa on the tapes. The sintering stress a of a porous solid can be estimated in a relationship as:

$$\sigma = \frac{2\gamma_s}{r_p}$$

where $\gamma_s$ is the surface energy and $r_p$ is the radius of pores (Evans, J. W. and De Jonghe, L. C. (1991), *The Production of Inorganic Materials*, MacMillan Publishing Co., New York, N.Y., p. 417). for molten oxides, the $\gamma_s$ values vary from $10^{-1}$ to 1 N/m (Kingery, W. D. et al. (1991), *Introduction to Ceramics*, $2^{nd}$ Ed., John Wiley & Sons, New York, N.Y., p. 183), which may lead to a sintering stress with a range of 1–10 MPa. However, this rough estimation can be affected by other factors, such as particle and pore size distribution in green bodies. Nevertheless, the sintering stress is much larger than the applied pressure on the tapes. As a result, one can expect that the cover plate should not hinder the shrinkage of PLZT tapes during sintering. This argument has been verified by measuring the length and width of PLZT tapes before and after firing. It was found that the linear shrinkage of a PLZT tape sintered under 50 Pa applied pressure was the same as the one sintered under 100 Pa pressure. Therefore, PLZT tapes shrink unconstrained within the sandwich structure during sintering, in contrast to the "constrained sintering" (Scherer, G. W. and Garino, T. J. (1985) J. Am. Ceram. Soc. 68(4):216; Bordia, R. K. and Raj, R. (1985) J. Am. Ceram. Soc. 68(6):287), where a ceramic film is constrained on a rigid substrate and the shrinkage can occur only in the direction perpendicular to the plant of the substrate. However, large stresses can develop at some contact points between the tapes and setter powder layers with a nonuniform thickness which may lead to cracking of PLZT tapes. Similarly, warped cover plates could result in cracked tapes after sintering for the same reason.

After binder burnout, the refractory setter powders are left on the surfaces of the ceramic tapes to resist bonding or fusion and provide a "slippery" medium between the tapes and setter plates. In general, the solids loading of the binder layer in the setter powder deposition sheet can range from about 1 wt % to about 60 wt %. However, higher solids loading in buffer sheets may cause wrinkling, warping and cracking of sintered tapes, particularly in applications to thin tapes, possibly due to the pile-up of setter powders as the tapes shrink during sintering. For applications to thin tapes and articles with thin walls, setter powder deposition sheet solids loading is preferably kept sufficiently low to avoid setter powder pile up. For zirconia setter powder solids loading between about 1 wt % to about 15 wt % is generally suitable to avoid undesirable setter pileup. Again for zirconia setter powder, solids loading between about 5 wt %–10 wt % is preferred for applications to ceramic tapes and solids loading between about 7.5% to about 10 wt % is more preferred. Preferred solids loading of setter deposition sheets may vary with the use of different setter powders. However, solids loading of setter deposition sheets can be optimized for a given application with a given setter powder without undue experimentation in view of the disclosures herein and what is generally known in the art. Low solids loading in the buffer as well as the use of flat and light-weight cover plates during sintering results in flat and crack-free ceramic tapes with low loss of volatile components can be made. These methods are particularly suitable for manufacture of piezoelectric ceramic tapes and more particularly useful for sintering green ceramic tapes that have thicknesses in the ranges of hundreds of microns.

In specific embodiments, setter powder deposition sheets of this invention are prepared using tape casting methods that are similar to those employed in the production of thin, flat ceramic tapes and sheets. Tape casting methods are described for example in Mistler, R. E. et al. (1978) "Tape Casting of Ceramics" in *Ceramic Processing Before Firing* (Onoda, G. Y. and Hench, L. L., eds) pp. 411–448, John Wiley & Sons, New York, 1978; Williams, J. C. (1976) "Doctor Blade Process" in Treatise on Materials Science and Technology Vol. 9 of *Ceramic Fabrication Processes* (Wang, F. F. Y., ed) pp. 173–198, Academic Press, New York; Hotza, D. and Greil, P. (1995) "Reviews: Aqueous Tape Casting of Ceramic Powders," Mater. Sci. Eng. A202, pp.206–217; Hellebrand H. (1996) "Tape Casting" in Materials Science and Technology; a comprehensive treatment, Vol. 17A, *Processing of Ceramics,* Part I (Cahn, R. W., et al., eds) VCH, New York, N.Y.; Shanefield, D. J. (1996) Organic Additives and Ceramic Processing, e.g., Chapters 7 and 8, Kluwer Academic, Norwell, Mass.; Cannon, W. R., et al. (1986) "Disperants for Nonaqueous Tape Casting" in Multilayer Ceramic Devices (Blum, J. B., ed) pp. 161–174 American Ceramic Soc. Westerville, Ohio. Alternative carrier materials and slurry components for preparation of setter powder deposition sheets, for example, can be selected based on what is known in the art of ceramics tape casting.

Setter powder deposition sheets of this invention can generally be employed in any ceramic processing method that employs setter powders. The sheets herein are employed in place of loose setter powder in ceramic processing to achieve at least equivalent results with improved efficiency, lower-cost and/or decreased hazard.

The following examples are intended to further illustrate the invention and are not intended to limit the invention.

EXAMPLES

Example 1
Processing of Buffer Sheets

Slurries were composed of about 5–about 10 wt. % of zirconia high purity powder with average particle size of about 12–about 18 $\mu$m, about 1 wt. %–about 4 wt. % water-soluble binder, e.g., hydroxypropyl methylcellulose, about 0.3 wt %–about 1.2 wt. % plasticizer, e.g., polypropylene glycol 1000, about 0.1 wt. %–about 0.9 wt. % wetting agent, e.g., ethoxylated 2,4,7,9-tetramethyl 5 Decyn-4,7-Diol (Surfynol® SE-F, Air Products, Allentown, Pa.) as a wetting agent in D.I. water. A desired viscosity for tape casting slurries was achieved using a relatively small amount of the binder that lead to a fairly high strength of thin buffer sheets.

In order to obtain a homogeneous slurry, the binder was dissolved in water using two steps. Binder powder was first dispersed by stirring in hot water (90° C.). Other slurry components were then added into this binder solution using zirconia grinding media. The slurry composition was then roll-milled for 2–4 hours.

In a specific example, tape casting to prepare setter powder deposition sheets was performed using a table top caster (TTC-1000, Richard E. Mistler, Inc., Morrisville, Pa.) with an 8 inch wide single doctor blade. The carrier was Mylar (S1P-75, 75 $\mu$m thick, silicone-coated on one side, Richard E. Mistler, Inc.). Slurry was cast on the side of the Mylar that was not coated with silicone. The side of the Mylar on which the slurry was cast was initially coated with thin layer of wetting agent. Neat wetting agent was rubbed onto the surface of the Mylar carrier using a cloth. The gap setting of the doctor blade was set at 0.45 mm. The cast sheets were dried in the drying zone of the tape caster with airflow rate 90 to 120 cm/mi. The thickness of the dried sheets was measured to be about 30 $\mu$m.

The following procedure was specifically used in the preparation of zirconia-containing buffer sheets. The slurry composition employed to make buffer sheets contained: 16 g zirconia (Reactor Grade, Oremet-Wah Chang, Albany, Oreg., average particle size 12–18 microns); Methocel water-soluble binder 2.8 g (Grade 4 FM, Dow Chemical Company, Midland, Mich.), 1.2 g wetting agent, Surfynol SE-F (Air Products, Allentown, Pa.); 1.5 g (Polypropylene Glycol 1000, Aldrich, Milwaukee, Wis.). Buffer sheets were made as described above on Mylar carrier (S1P-75, 75 $\mu$m thick, silicone-coated on one side).

Example 2
Use of Buffer Sheets in Firing Ceramic Tapes

The zirconia-containing buffer sheets were cut and stacked with three green PLZT tapes (9 cm×9 cm×150 $\mu$m), which were then put between two dense zirconia cover plates (10 cm×10 cm×8 mm, TYK Refractories, Seattle, Wash.). The stacked tapes and buffer sheets were fired by the following schedule: (1) 0.5° C./min to 500° C., hold for 3 hours to burn out organic additives; (2) 3–5° C./min to 1200° C., hold for 2–3 hours to sinter the tapes; and (3) 5–10° C./min to cool to room temperature.

Green PLZT tapes were prepared by non-aqueous tape casting using a xylene/ethanol mixture. In general, PLZT powders (Proxair Specialty Ceramics, Woodinville, Wash.) with an average particle size of about 0.5 $\mu$m were used. Blown Z-3 menhaden fish oil (Werner G. Smith, Inc., Cleveland, Ohio) was added to the PLZT slurry as a dispersant. Menhaden fish oil is one of the most common and effective dispersants used in non-aqueous slurries. It is a naturally-occurring oil composed largely of glycerol esters of saturated and unsaturated fatty acid. Polyvinyl butyral (PVB, Butvar B-98, Solutia, Inc., St. Louis, Mo.) was added to the slurry as a binder that has a higher burn-out temperature than the binder used in the buffer sheets (Methocel). Polyethylene glycol (Carbowax 400, Union Carbide, Co., Danbury, Conn.) and butyl benzyl phthalate (Santicizer 160, Solutia, Inc., St. Louis, Mo.) were added as plasticizers. The PLZT green tapes processed had a thickness of about 150 $\mu$m.

In a specific example, PLZT tapes were prepared from a PLZT slurry containing:

61.4 wt. % PLZT powders (particle size ($d_{50}$) 0.48 μm; surface area=9.1 m$^2$/g, 5H2 powder, Proxair Specialty Ceramics, Woodinville, Wash.);

24.3 wt. % xylenes (Fisher Scientific, Pittsburgh, Pa.);

6.1 wt. % ethanol (McCormick Distilling Co., Weston, Mo.);

1.2 wt. % menhaden fish oil (Werner G. Smith, Inc., Cleveland, Ohio);

3.5 wt. % polyvinyl butyral (Butvar β-98, Solutia, Inc., St. Louis, Mo.);

1.8 wt. % butyl benzyl phthalate (Santicizer 160, Solutia Inc., St. Louis, Mo.); and 1.7 wt. % polyethylene glycol (Carbowax, Inc., Union Carbide Co., Danbury, Conn.).

Suspensions containing particles, solvents and dispersant were first roll-milled with zirconia media for about 24 h. The binder and plasticizers were then added into the slurries and roll-milled for another about 16 h. The slurries were de-aired under vacuum to removeany entrapped air bubbles and cast using a table top caster (TTC-1000, Richard E. Mistler, Inc., Morrisville, Pa.) on silicone-coated Mylar foils through an 8 inch wide single doctor blade. The cast tapes were dried in the drying zone of the tape caster with airflow rate 90–120 cm/min.

Zirconia-containing setter powder deposition sheets as described in Example 1 were inserted between the green PLZT tape and the cover plate and heated as noted above.

During binder burn-out of buffer sheets, a thin layer of uniformly distributed zirconia particles formed between the PLZT tapes and the dense ceramic cover plates. The sintered PLZT tapes resulting from this process were crack-free and easy to separate from each other, exhibited excellent uniformity, flatness, and surface quality and exhibited excellent electrical and mechanical. Using this method large area PLZT tapes did not stick to setter plates and exhibited low PbO losses after firing. Retention of PbO allows stoichiometry control which leads to piezoelectrics with superior properties.

An attempt to prepare a PLZT tape starting with a green tape of the same composition and thickness (150 μm), but without the use of buffer sheets in conjunction with the cover plates during firing, resulted in a badly fractured PLZT ceramic plate with high PbO loss.

Example 3
Characterization of Buffer Sheets

Wetting studies were performed using 1 wt. % hydroxypropyl methylcellulose binder solutions prepared by the following procedures. The binder was first dispersed under constant stirring in hot water (90° C.). Hydration of cellulose ether occurs during slow cooling of the suspension to room temperature. Each binder solution with different amounts of wetting agent ethoxylated 2,4,7,9-tetramethyl 5 Decyn-4,7-Diol (Surfynol® SE-F, Air Products, Allentown, Pa.) were placed in a 250 ml milling jar with 80 of 9.5 mm diameter zirconia grinding media (YZ-110HS, Norton Advanced Ceramics, Export, Pa.) and homogenized by roll-milling for 4 hours. To study the wetting behavior, about 0.05 ml binder solution was dropped on a Mylar foil placed on a flat glass plate. The sessile drop was large enough to avoid the drop size effect (Good, R. J. and Koo, M. H. (1979) J. Colloid Interface Sci. 71(2):283). The shape of the droplet was recorded with a camera, as illustrated in FIGS. 3a–d to measure the contact angle on a printed photograph. These figures also examine the effect of coating the carrier with wetting agent prior to coating with the binder. A graph of contact angles as a function of concentration of wetting agent in binder is provided in FIG. 4. At least 10 drops, on different locations of the Mylar foil were recorded for each solution.

The burnout behavior of the binder was monitored by the thermogranimetric analysis (TGA) (STA 409C, Netzsch, Selb, Germany) at a heating rate of 5° C./min. Results are illustrated in FIG. 6. The loss of PbO was measured from the weight difference of a PLZT tape before and after sintering at 1100° C. The weight loss measurements were performed on a sample which was repeatedly sintered for one hour at a heating and cooling rate of 5° C./min.

Viscosity measurements of the tape casting slurries were conducted at shear rates between 5 to 80 s$^{-1}$ using a concentric cylinder viscometer (VT550 and sensor MV-1, Haake, Germany).

Those of ordinary skill in the art will appreciate that materials and methods other than those specifically described herein can be employed in the practice of this invention without departing from the scope of the invention. For example, appropriate starting materials for preparation of setter powder deposition sheets can be readily selected by one of ordinary skill in the art, in view of description herein, without resort to undue experimentation. Further, the setter powder deposition sheets of this invention can be employed in combination with a variety of known methods for ceramics processing, including processing of green ceramic tapes prepared by a variety of tape casting methods other than those specifically described herein.

All references cited herein are incorporated by reference in their entirety herein to the extent that they are not incompatible with the disclosure herein.

We claim:

1. A method for sintering a green ceramic tape having a thickness less than or equal to about 100 microns prior to sintering which comprises the steps of:

(a) prior to sintering, applying at least one top and at least one bottom setter powder deposition sheet to the top and bottom surfaces of the tape, respectively, wherein the setter powder deposition sheet comprises a carrier having a binder layer impregnated with setter powder or particles, wherein the setter powder or particles are ceramic powder or particles which constitute between about 1% and about 15% by weight of the binder layer;

(b) prior to sintering, placing a bottom cover plate such that the bottom setter powder deposition sheet is positioned between the bottom surface of the tape and the bottom cover plate;

(c) prior to sintering, placing a top cover plate such that the top setter powder deposition sheet is positioned between the top surface of the tape and the top cover plate, wherein the force applied by the top cover plate to the top and bottom sheets and the tape is selected so that the tape remains flat during sintering and so that shrinkage of the tape in a plane parallel to the cover plate can occur during sintering, said shrinkage causing movement of the setter particles; and (d) sintering the green ceramic tape.

2. The method of claim 1 wherein the sintering method further employs stacking of green ceramic tapes and wherein setter powder deposition sheets are positioned between surfaces of the stacked green tapes.

3. The method of claim 1 wherein the tape is a piezoelectric ceramic tape.

4. The method of claim 1 wherein the setter powder deposition sheet comprises a water-soluble binder.

5. The method of claim 4 wherein the binder is a methylcellulose binder.

6. The method of claim 1 wherein the binder layer on the setter powder deposition sheet further comprises a wetting agent.

7. The method of claim 1 wherein the binder layer on the setter powder deposition sheet further comprises one or more plasticizers.

8. The method of claim 1 wherein the carrier of the setter powder deposition sheet is a polyester film.

9. A method for sintering a green ceramic tape subject to loss of a volatile inorganic component during sintering which comprises the steps of:

(a) prior to sintering, applying at least one top and at least one bottom setter powder deposition sheet to the top and bottom surfaces of the tape, respectively, wherein the setter powder deposition sheet comprises a carrier having a binder layer impregnated with setter powder or particles, wherein the setter powder or particles are ceramic powder or particles which constitute between about 1% and about 15% by weight of binder layer;

(b) prior to sintering, placing a bottom cover plate such that the bottom setter powder deposition sheet is positioned between the bottom surface of the tape and the bottom cover plate, wherein the bottom cover plate is dense and chemically compatible with the green tape;

(c) prior to sintering, placing a top cover plate such that the top setter powder deposition sheet is positioned between the top surface of the tape and the top cover plate, wherein the force applied by the top cover plate to the top and bottom sheets and the tape is selected so that the tape remains flat during sintering and so that shrinkage of the tape in a plane parallel to the cover plate can occur during sintering, said shrinkage causing movement of the setter particles, and wherein the top cover plate is dense and chemically compatible with the green tape; and (d) sintering the green ceramic tape, wherein the green tape provides the only source of the volatile component during the sintering process;

whereby the loss of the volatile inorganic component is minimized.

10. The method of claim 9 wherein the loss of lead oxide from a PZT tape during sintering is minimized.

11. The method of claim 9 wherein the loss of lead oxide from a PLZT tape during sintering is minimized.

12. The method of claim 9 wherein at least two green ceramic tapes are stacked and wherein setter powder deposition sheets are positioned between the surfaces of the stacked tapes.

13. The method of claim 12 wherein the loss of lead oxide from the stacked PZT tapes during sintering is minimized.

14. The method of claim 12 wherein the loss of lead oxide from the stacked PLZT tapes during sintering is minimized.

15. The method of claim 9 wherein the cover plates are zirconia ($ZrO_2$).

16. The method of claim 9 wherein the cover plates are magnesia (MgO).

17. The method of claim 9 wherein the setter powder is zirconia ($ZrO_2$) powder.

18. The method of claim 9 wherein the setter powder is magnesia (MgO) powder.

19. The method of claim 9 wherein the tape is a piezoelectric ceramic tape and the loss of lead oxide from the tape is less than about one percent after firing at about 1100° C. for up to about 10 hours.

* * * * *

UNITED STATES PATENT AND TRADEMARK OFFICE
CERTIFICATE OF CORRECTION

PATENT NO. : 6,447,712 B1
DATED : September 10, 2002
INVENTOR(S) : Dogan et al.

It is certified that error appears in the above-identified patent and that said Letters Patent is hereby corrected as shown below:

<u>Title page,</u>
Item [57], ABSTRACT, please replace "Setter," with -- Setter --.
Item [56], OTHER PUBLICATIONS, in reference "Zhilun, Gui et al." please replace "72()" with -- 72(3) --.

<u>Column 1,</u>
Line 23, please replace "1 85" with -- 185 --.
Line 40, please replace "tape" with -- tapes --.

<u>Column 2,</u>
Line 21, please replace "disperse" with -- dispersed --.

<u>Column 3,</u>
Line 59, please replace "minimizes" with -- minimize --.

<u>Column 4,</u>
Line 19, please replace "results" with -- result --.
Line 35, please replace "suitably" with -- suitable --.

<u>Column 5,</u>
Line 2, please replace "inthe" with -- in the --.
Line 35, please replace "powder of particles" with -- powder or particles --.

<u>Column 6,</u>
Line 43, after "of binder", please insert -- , --.
Line 44, after "(if present)", please insert -- , --.
Line 45, after "(if present)", please insert -- , --.
Line 64, please replace "than that any" with -- than that of any --.

<u>Column 8,</u>
Line 64, please replace "is a graph shows" with -- is a graph which shows --.

<u>Column 9,</u>
Line 6, please replace "difference" with -- differences --.
Lines 12 and 13, please replace "mP a-s" with -- mPa-s --.

<u>Column 10,</u>
Line 17, please replace "beneficial choosing" with -- beneficial to choose --.
Line 18, please replace "in presence of" with -- in the presence of --.
Line 25, please replace "stress a" with -- stress σ --.

UNITED STATES PATENT AND TRADEMARK OFFICE
CERTIFICATE OF CORRECTION

PATENT NO. : 6,447,712 B1
DATED : September 10, 2002
INVENTOR(S) : Dogan et al.

It is certified that error appears in the above-identified patent and that said Letters Patent is hereby corrected as shown below:

Column 11,
Line 20, please delete "can be made".

Column 12,
Line 5, please replace "lead" with -- leads --.

Column 13,
Line 20, please replace "removeany" with -- remove any --.
Line 35, after "electrical and mechanical" please insert -- properties --.

Column 14,
Line 6, please replace "thermogranimetric" with -- thermogravimetric --.
Line 22, please replace "of description" with -- of the description --.

Signed and Sealed this

Eleventh Day of March, 2003

JAMES E. ROGAN
*Director of the United States Patent and Trademark Office*